(12) United States Patent
Stahl

(10) Patent No.: US 9,511,413 B2
(45) Date of Patent: Dec. 6, 2016

(54) METHOD OF MAKING STRIP FORMED BY WEB-CONNECTED WIRES

(71) Applicant: HACANOKA GMBH, Voehringen (DE)

(72) Inventor: Karl-Hermann Stahl, Voehringen (DE)

(73) Assignee: CENT & CENT GMBH & CO. KG (DE)

( * ) Notice: Subject to any disclaimer, the term of this patent is extended or adjusted under 35 U.S.C. 154(b) by 0 days.

(21) Appl. No.: 14/581,214

(22) Filed: Dec. 23, 2014

(65) Prior Publication Data

US 2015/0202679 A1     Jul. 23, 2015

Related U.S. Application Data

(63) Continuation of application No. 12/598,000, filed as application No. PCT/DE2008/000224 on Feb. 8, 2008, now abandoned.

(30) Foreign Application Priority Data

May 4, 2007 (DE) ........................ 10 2007 020 992

(51) Int. Cl.
  *B21C 37/00*   (2006.01)
  *B21F 45/24*   (2006.01)
  (Continued)

(52) U.S. Cl.
  CPC .............. *B21F 45/24* (2013.01); *B21D 11/08* (2013.01); *B21H 8/00* (2013.01); *F16B 15/0015* (2013.01);
  (Continued)

(58) Field of Classification Search
  None
  See application file for complete search history.

(56) References Cited

U.S. PATENT DOCUMENTS

| 867,090 A | 9/1907 | Wolf |
| 872,127 A | 11/1907 | Havemeyer |

(Continued)

FOREIGN PATENT DOCUMENTS

| DE | 287820 | 6/1913 |
| DE | 540837 | 12/1931 |

(Continued)

OTHER PUBLICATIONS

International Preliminary Report on Patentability in Application No. PCT/DE2008/000224 dated Nov. 10, 2009.
English Language Translation of JP 61-125719. Jun. 1986.

*Primary Examiner* — Daniel J Schleis
(74) *Attorney, Agent, or Firm* — J.A. Lindeman & Co., PLLC

(57) ABSTRACT

The method serves for the production of a wire strip (1) comprising a plurality of wires (2) arranged parallel to each other. For this purpose a metal strip is first pre-notched either on one side or both sides for the formation of the wires (2), whereby wires (2) are generated which are still connected to webs (3). To transform the webs (3) subsequently into thin, easy to separate and, when separated, smooth and burr-free separation webs forming separation areas, the wire strip (1) is subjected to a milling process during which each web (3) is subjected to a multiple bending strain along the longitudinal axis thereof in such a way that incipient cracks form, due to fatigue fracture, in the area of the webs (3), and thereby the separation web is created.

23 Claims, 4 Drawing Sheets

Figure 1:
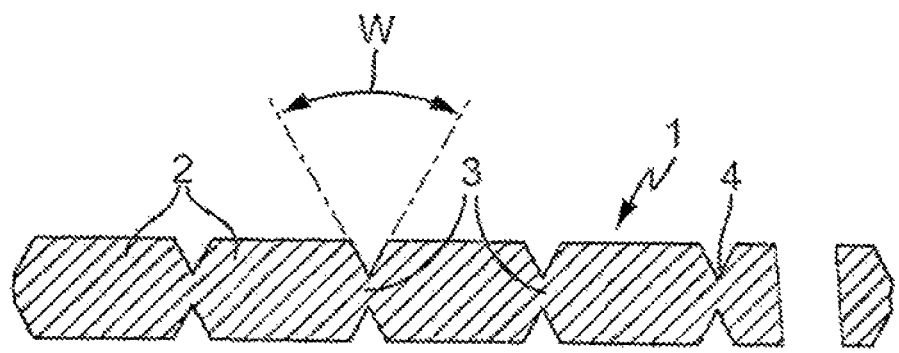

(51) Int. Cl.
*B21H 8/00* (2006.01)
*F16B 15/00* (2006.01)
*F16B 15/08* (2006.01)
*B21D 11/08* (2006.01)

(52) U.S. Cl.
CPC ........ *F16B 15/08* (2013.01); *Y10T 428/12188* (2015.01); *Y10T 428/12194* (2015.01)

(56) References Cited

U.S. PATENT DOCUMENTS

| | | |
|---|---|---|
| 928,430 A | 7/1909 | Dudley |
| 931,185 A | 8/1909 | Dudley |
| 931,322 A | 8/1909 | Lindau |
| 939,962 A | 11/1909 | Jenks |
| 982,682 A | 1/1911 | Johnson |
| 984,283 A | 2/1911 | Maxwell |
| 1,023,149 A | 4/1912 | Havemeyer |
| 1,076,439 A | 10/1913 | McKibbin |
| 1,147,603 A | 7/1915 | Boyer |
| 1,164,477 A | 12/1915 | Dale et al. |
| 1,280,046 A | 9/1918 | Kuhne |
| 1,364,182 A | 1/1921 | Conkling |
| 1,423,163 A | 7/1922 | Simpson |
| 1,477,378 A | 12/1923 | Ohlson et al. |
| 1,635,658 A | 7/1927 | Boardman |
| 2,053,375 A | 9/1936 | Nicholas |
| 2,216,869 A | 10/1940 | Yoder et al. |
| 2,347,904 A | 5/1944 | Greulich |
| 2,635,493 A | 4/1953 | Schumacher |
| 2,659,950 A | 11/1953 | West |
| 2,775,151 A | 12/1956 | Schumacher |
| 2,948,084 A | 8/1960 | Shockey |
| 3,092,470 A | 6/1963 | Ripling |
| 3,170,279 A | 2/1965 | Dubini |
| 3,214,877 A | 11/1965 | Akin |
| 3,628,710 A * | 12/1971 | Stehle et al. ................. 225/96.5 |
| 3,953,953 A | 5/1976 | Marsden |
| 4,008,597 A | 2/1977 | Bartram et al. |
| 4,011,109 A | 3/1977 | Golland et al. |
| 4,066,153 A * | 1/1978 | Plentz ...................... 188/196 M |
| 4,066,165 A | 1/1978 | Ruskin |
| 4,109,500 A | 8/1978 | Franek |
| 4,137,686 A | 2/1979 | Kern |
| 4,155,238 A | 5/1979 | Rogers |
| 4,267,985 A | 5/1981 | Rogers |
| 4,305,187 A | 12/1981 | Takahiro et al. |
| 4,804,585 A | 2/1989 | Tani et al. |
| 4,883,713 A | 11/1989 | Destree et al. |
| 4,960,649 A | 10/1990 | Takata et al. |
| 5,039,366 A | 8/1991 | Strattman |
| 5,215,830 A | 6/1993 | Cinti |
| 5,451,471 A | 9/1995 | Over et al. |
| 5,477,721 A | 12/1995 | Barnes |
| 5,989,713 A | 11/1999 | Naaman |
| 6,060,163 A | 5/2000 | Naaman |
| 6,235,108 B1 | 5/2001 | Lambrechts |
| 7,316,849 B2 | 1/2008 | Boegel et al. |
| 2003/0152738 A1 | 8/2003 | Boegel et al. |
| 2006/0121241 A1 | 6/2006 | Bonds |
| 2007/0050960 A1 | 3/2007 | Stuhlbacher et al. |
| 2007/0261354 A1 | 11/2007 | Chang |
| 2011/0212343 A1 | 9/2011 | Stahl |

FOREIGN PATENT DOCUMENTS

| | | |
|---|---|---|
| DE | 805711 C | 5/1951 |
| DE | 1930914 A1 | 12/1970 |
| EP | 0098825 A1 | 1/1954 |
| EP | 0098825 A1 | 1/1984 |
| EP | 0861948 A1 | 9/1998 |
| EP | 1356887 | 10/2003 |
| EP | 1356887 A2 | 10/2003 |
| EP | 1375773 A2 | 1/2004 |
| EP | 1623774 A1 | 2/2006 |
| FR | 1382445 A | 12/1964 |
| GB | 537553 A | 6/1941 |
| GB | 664170 A1 | 1/1952 |
| GB | 1247943 A | 9/1971 |
| GB | 2053754 A | 2/1981 |
| HU | 212747 | 4/1996 |
| HU | 212747 B | 10/1996 |
| JP | 57094403 A | 6/1982 |
| JP | 57094403 A | 6/1982 |
| JP | 58032529 | 2/1983 |
| JP | 58032529 A | 2/1983 |
| JP | 58-143910 | 4/1985 |
| JP | 61-125719 | 3/1988 |
| JP | 60167502 | 5/1989 |
| JP | 61067502 A | 5/1989 |
| JP | H1034253 A | 2/1998 |
| SU | 471164 A1 | 5/1975 |
| WO | 2011018063 A1 | 2/2011 |
| WO | 2011018064 A1 | 2/2011 |
| WO | 2011041995 A1 | 4/2011 |
| WO | 2012031577 A3 | 3/2012 |
| WO | 2013029595 A1 | 3/2013 |
| WO | 2013050013 A1 | 4/2013 |
| WO | 2013071912 A1 | 5/2013 |

* cited by examiner

METHOD OF MAKING STRIP FORMED BY WEB-CONNECTED WIRES

The invention relates to a method of making a strip formed by a plurality of parallel wires, wherein a sheet-metal strip is first grooved on one or both sides to form wires interconnected by webs. The invention further relates to a metal strip made according to the method.

In order to make such strips as needed, for example, for the production of staples, various methods are known from the prior art. For example, DE 287820 describes a method whereby prefabricated wires are glued, soldered, or welded together at points such that strips of metal are created comprised of the desired amount of wires that may subsequently be separated from each other.

It is known from DE 540837 to process metal strips in a punching process such that individual parts may be removed from the metal strip by a subsequent separation of remaining webs.

The object of the invention is to provide a manufacturing method enabling the production of strips of the type described above, requiring no additional connection techniques, but that still comprise wires that are as burr-free as possible after the subsequent separation thereof according to the requirements of the final product.

The object is attained according to the invention in that for the making the webs that are thin and easily separated and that, when separated, have smooth and burr-free edge faces, the strip is subjected to a bending process during which each web is subjected to a multiple bends along its longitudinal axis in such a way that incipient cracks form due to fatigue fracture at the webs, and thereby a separation web is created.

The advantage achieved by the invention is substantially that edge faces are formed that are largely smooth and burr-free, utilizing the metallurgical effect of fatigue fracture, without causing a complete separation of the wires formed in this manner. As a result the separation may be carried out later—such as in a stapler, or before further processing requiring a complete separation of the wires from each other—without any great expenditure of energy, the desired burr-free and smooth separation surface then becoming visible. The method has the particular advantage that the retrospective processing of the edge faces, as is common in other methods of production, i.e. trimming or stamping, is not necessary in this case.

The minimum depth of the grooves should be selected such that cracks due to fatigue fracture are caused at the groove base by the bending process.

Normally, it is advantageous to select the maximum depth of the V-shaped grooves such that the deformation capacity of the materials is nearly exhausted at the webs. The thickness of the web remaining after groove formation may particularly be within the range of between 20% and 95% of the thickness of the strip, the thickness of the webs thus being substantially determined by the ductility of the material.

It has further proven advantageous within the scope of the invention when the bending process comprises one-sided, multiple bends up to fatigue fracture at the webs with regard to the plane of the strip. As an alternative, the bending process may also comprise double-sided, multiple bends up to fatigue faction at the webs with regard to the plane of the strip.

The bending process may be carried out such that the multiple bends of the web are at about the same angles. Depending on the case of application and structure of the material, however, it may also be advantageous instead, if the multiple bends of the webs are at increasing or decreasing angles.

The multiple bends of the webs should advantageously be at an angle that is smaller than the groove angle.

In order to separate the strips completely, or just locally from each other, the separation web may be split by a slight deflection transversely of the web of adjacent strips immediately adjacent each other. Here care should be taken that the remaining web areas and the perforation zones created meet the requirements of the intermediate product or the processing possibilities of the final product. For this reason markings may be applied to the strip corresponding to the total length of the final product, and which may be queried during processing of the strip. However, it is also possible to initially not create any perforation zone after the bending process, but instead to carry out the geometry of the remaining webs and of the perforation zone according to the requirements of the respective product utilizing a suitable device directly in front of the further processing system.

Finally, it is recommended with the use of the method that strip-shaped semifinished products made from metal are utilized as starting material.

The article of manufacture that is the object of the invention, a metal strip formed of a plurality of parallel wires connected to each other via webs, is attained by a strip-shaped semifinished product used as starting material that is grooved on one or on both sides for forming the wires, the webs being made thin a, easily separated and, when separated, smooth and burr-free edge faces having fatigue fracture and formed by multiple bends via a bending process.

Incipient cracks by fatigue fracture are created on the web bases via the bending process so that the webs are weakened. The edge faces created by fatigue fraction are relatively smooth and free of burrs. The remainder of the webs can be very thin because they are positioned at the neutral phase of the bending process; the wires can therefore be easily separated from each other.

Such a wire has the advantage of forming smooth and burr-free edge faces during the separation of individual wires via the existing fatigue fraction, while simultaneously the forces required for the separation remain within reasonable limits of the application.

A recommended metal within the scope of the invention is basically stainless steel, iron, copper, or aluminum. Furthermore, the metal may also be a coated metal strip, particularly galvanized or copper-plated iron strip. The metal may also be a material to which high strength was imparted by rolling.

The opening angle of the grooves in the strip is advantageously between 30° and 120°.

The thickness of the webs is advantageously within the range of between 20% and 95% of the thickness of the strip and is determined by the properties of the metal, particularly its ductility.

Further within the scope of the invention, the webs have incipient cracks due to fatigue fracture transverse to the grooved strip on the highly reinforced groove base in the surface area by the bending process, producing a smooth surface and further reducing the formation of burrs during the subsequent separation process. In order to keep the separating force low it may also be advantageous if the separation webs also have locally occurring perforations in longitudinal direction.

Within the scope of the invention it has also proven advantageous if in coated metal strips the top and bottom sides of the wires are coated with a relatively uniform layer thickness but the narrow sides of the wires at the groove flanks have a decreasing layer thickness toward the fracture zone due to the groove, and the fracture zones themselves are not coated.

Typically, the wires will all have the same widths across the strip; however, within the scope of the invention it is also possible that the wires have different widths across the strip.

Finally, within the scope of the invention it is also possible that the substantially rectangular shape of the wires initially predetermined by the starting material is changed outside of the groove area according to the intended use.

Figure 2:
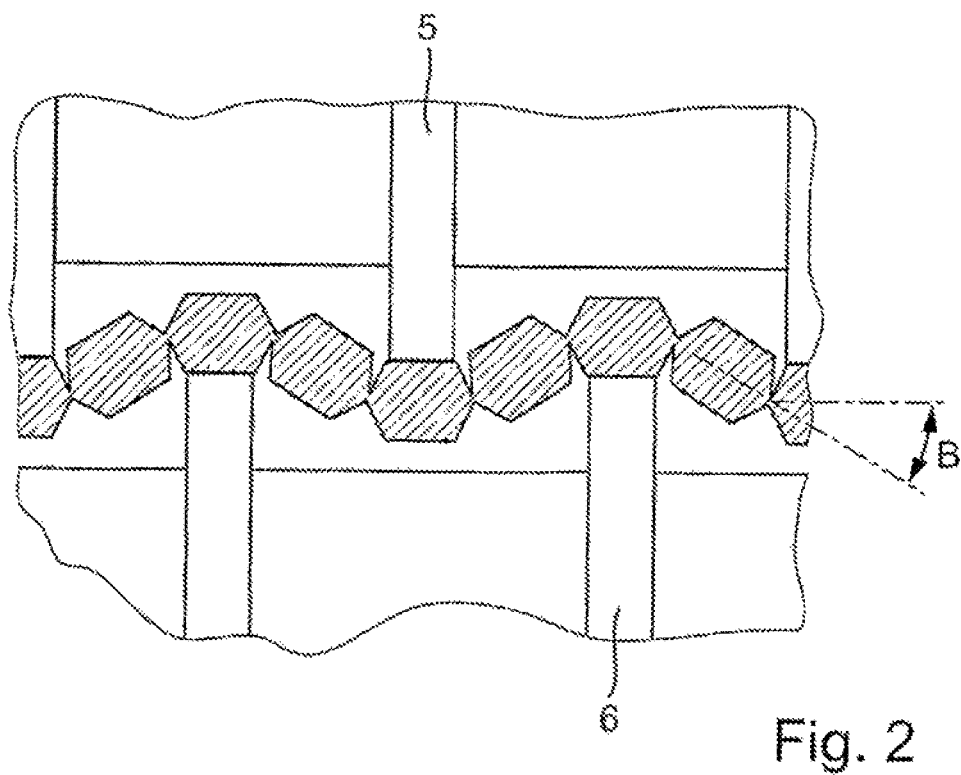
Figure 3:
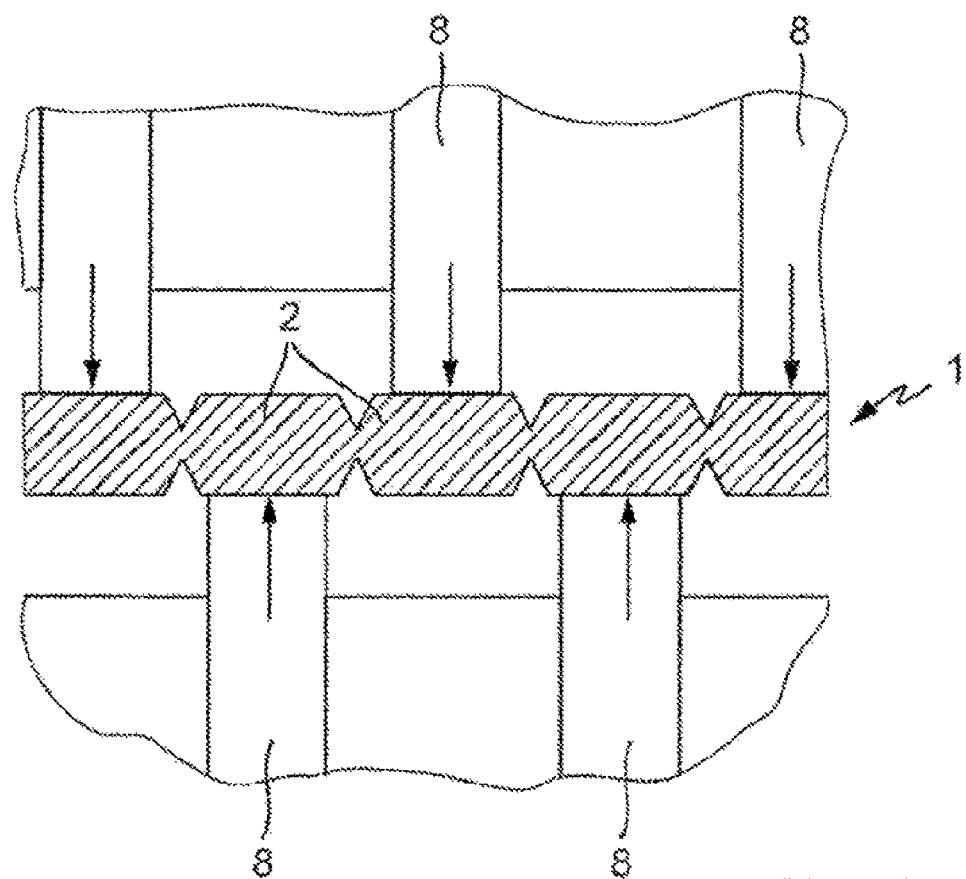
Figure 4:
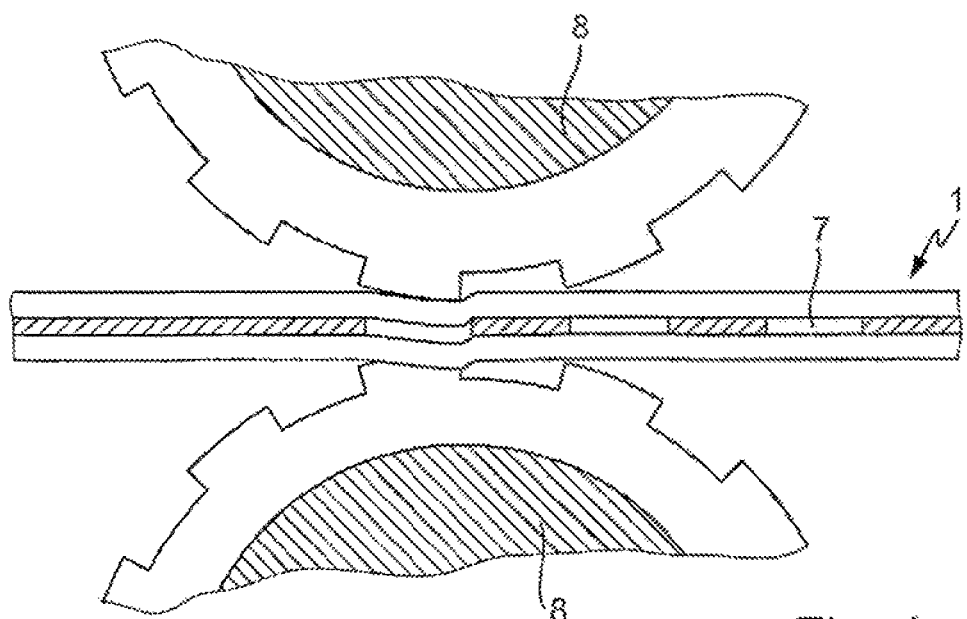
Figure 5:
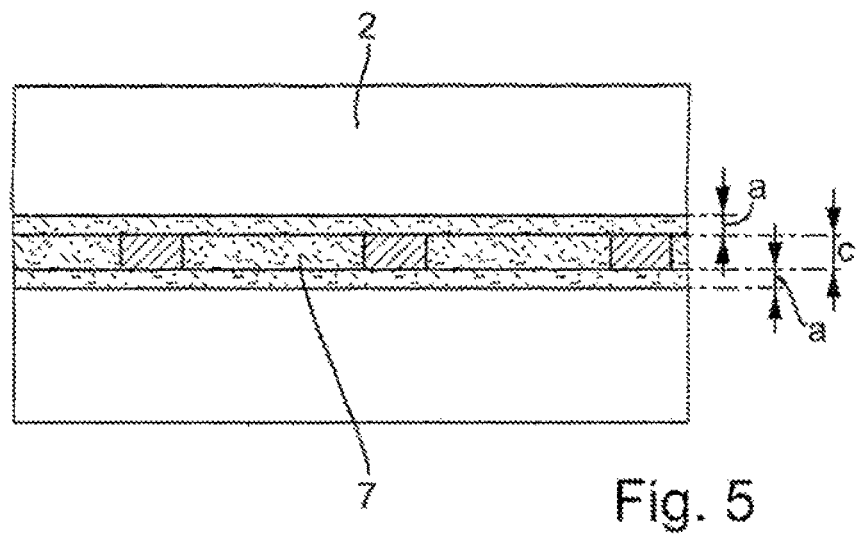
Figure 6:
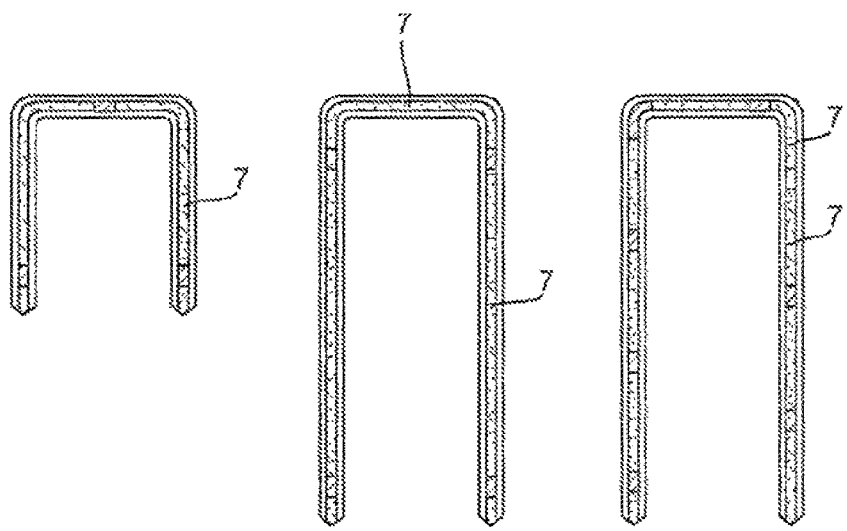
Figure 7:
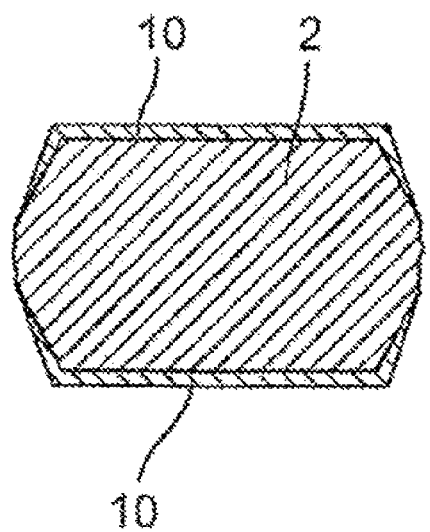

The invention is explained in further detail below based on an embodiment shown in the drawings. Therein:

FIG. 1 is a cross section through a partially illustrated starting material provided for the manufacture of the strip with already carried out groove formation, FIG. 2 shows the starting material for making the strip being subjected to a rolling process inducing bending strain, FIG. 3 a setup for the partial separation of the webs of the strip, FIG. 4 is a side view of the strip according to FIG. 3, FIG. 5 is a section through a detail of the strip at a groove, FIG. 6 shows sections through the strip at a groove with a strip bent into a U-shape for use as a staple for various illustrated embodiments, FIG. 7 is a cross-section through an individual coated wire.

The arrangement illustrated in the drawing serves for making a strip 1 formed by a plurality of parallel wires 2.

To this end, a sheet-metal strip is first grooved either on one or both sides to form the wires 2 in a manner not illustrated in detail in the drawing, the thus produced wires 2 being interconnected by webs 3 as shown in FIG. 1.

For the subsequent conversion of the webs into thin, easily separated and, when separated, smooth and burr-free separation webs forming separation areas, the strip is subjected to a bending process according to FIG. 2, during which each web is subjected to a multiple bends along its longitudinal axis by upper rollers 5 and lower rollers 6. In this manner incipient cracks are formed due to fatigue fracture at the webs 3, thereby creating a separation web that can be easily pulled apart later.

As seen in the drawing, groove formation is preferably carried out as a V-shaped grooves 4, wherein the groove angle W may be between 30° and 120°. For this purpose, as also obvious in the drawing, a groove angle W of about 60° is preferred.

For this purpose the thickness of the webs 3 may be within the range of about 20% to 95% of the thickness of the strip 1, dependent in particular on the ductility of the material. Usually the groove depth is selected such that the deformation capacity of the material is nearly exhausted at the webs 3.

The bending process comprises multiple bends either on one side or also on both sides with regard to the plane of the strip 1, as indicated in FIG. 2. For this purpose a plurality of roller arrangements comprising one upper roller 5 and one lower roller 6 each, are temporarily successively arranged in the running direction of the strip 1.

The multiple bends of the webs 3 through a bending angle B may be carried out at the same angles; however it is also possible that the multiple bends of the webs 3 are carried out by increasing or decreasing angles. The determination should be made according to the properties of the strip material used. Typically, for this purpose the multiple bends of the webs 3 will occur at an angle that is smaller than the groove angle W. Here a strip-shaped semifinished product made from metal is used as the starting material, for which a metal mainly comprising stainless steel, iron, copper, or aluminum is particularly suited. It is also possible to use coated metal strips, particularly galvanized or copper-plated iron strips. It has been proven particularly advantageous, if a metal is used whose strength has been increased by rolling.

With regard to the subsequent ability to separate the individual wires 2, the separation webs 3 may have longitudinally spaced short perforations 7. In order to create them, a roller device according to FIGS. 3 and 4 may be provided in the separation webs are locally ruptured by only a light deflection of adjacent wires 2 in opposite directions. Using an appropriate shape of the separation rollers 8 according to FIGS. 3 and 4 the position of the separation zones and remaining separation webs 9 may be adjusted to requirements as exist, for example, in a staple wire. This is obvious in detail in FIG. 4.

FIG. 5 shows a possible result of the treatment of a web 3 after a completed bending process and according to the local separation processes described above. Here areas a are two partially fractured zones created by the bending process. In contrast in area c the remaining web has already been locally separated and, as indicated by the shading, the remaining separation webs 9.

FIG. 6 shows examples of staple wires for which the formation of locally separated remaining webs and remaining webs may be suited.

In coated metal strips the upper and lower sides of the wires 2 may be coated with a relatively uniform coating thickness 10, while the narrow sides of the wires 2 may have a decreasing coating thickness at the grooves 4 toward the fracture zone, while the fracture zone itself is not coated. This is shown in the illustration of a single wire of FIG. 7.

Incidentally, the arrangement may also be selected in a manner also not shown in the drawing such that the wires 2 in the strip 1 have different widths. Generally, the wire thickness in the strip 1, however, will all be the same.

Finally, it is also possible in a manner also not illustrated in the drawing that the substantially rectangular section of the wires 2 initially predetermined by the starting material is transformed outside the grooved area according to the intended use.

The claimed invention is:

1. A method of making a strip formed by a plurality of parallel wires wherein a sheet-metal strip is first grooved on one or both sides to form wires interconnected by webs, characterized in that, for the subsequent conversion of the webs into thin and easily separated webs that when separated form smooth and burr-free edge faces, the strip is subjected to a bending process during which each web is subjected to multiple bends along the longitudinal axis of the strip, wherein the strip is alternated between an inclined position and a declined position with respect to the lateral width of the strip as the strip is subjected to the multiple bends and in such a way that incipient cracks form due to fatigue fracture at the webs, and thereby a separation web is created.

2. The method according to claim 1, characterized in that the groove formation is the formation of V-shaped grooves.

3. The method according to claim 2, characterized in that a groove angle W is between 30° and 120°.

4. The method according to claim 2, characterized in that a groove angle W is about 60°.

5. The method according to claim 1, characterized in that a thickness of the web is 20% to 95% of a thickness of the strip.

6. The method according to claim 1, characterized in that a depth of the V-shaped grooves is selected such that the deformation capacity of the material is nearly exhausted at the web.

7. The method according to claim 1, characterized in that the bending process comprises multiple bends up to fatigue fracture on one side with regard to the plane of the strip at the webs.

8. The method according to claim 1, characterized in that the bending process comprises multiple bends up to fatigue fracture on one side with regard to a plane of the strip at the webs.

9. The method according to claim 1, characterized in that the multiple bends of the webs are carried out at the same angles.

10. The method according to claim 1, characterized in that the multiple bends of the webs are carried out about increasing or decreasing angles.

11. The method according to claim 1, characterized in that the multiple bends of the webs are carried out at an angle that is smaller than the groove angle W.

12. The method according to claim 1, characterized in that the separation web is locally fractured by a slight deflection of adjacent wires relative to each other transversely of the strip.

13. The method according to claim 1, characterized in that strip-shaped semifinished products made from metal may also be utilized as the starting material.

14. A metal strip formed by a plurality of wires connected to each other via webs and made according to the method of claim 1, characterized by
a strip-shaped semifinished product utilized as a starting material and grooved on one or both sides for forming the wires, wherein by fatigue fracture from multiple bends the webs are made thin and easily separated and when separated form smooth and burr-free edge faces.

15. The strip according to claim 14, characterized in that the metal is stainless steel, iron, copper, or aluminum.

16. The strip according to claim 14, characterized in that coated metal strips, particularly galvanized or copper-plated iron strips, are used as the metal.

17. The strip according to claim 14, characterized in that the metal is a material having high strength created by rolling.

18. The strip according to claim 14, characterized in that the opening angle of the grooves is between 40° and 120°.

19. The strip according to claim 14, characterized in that the thickness of the webs is 20% to 95% of the thickness of the strip.

20. The strip according to claim 14, characterized in that the webs have surface cracks due to fatigue fracture on the high-strength groove base from transverse bending of the grooved strip, producing a smooth surface and reducing the formation of burrs during a subsequent separation.

21. The strip according to claim 14, characterized in that the separation webs longitudinally spaced short perforations.

22. The strip according to claim 14, characterized in that in case of coated metal strips upper and lower sides of the wires are coated with a relatively uniform coating thickness while the narrow sides of the wires have a decreasing coating thickness at the grooves toward a fracture zone which itself is not coated.

23. The strip according to claim 14, characterized in that the wires have different widths in the strip.

* * * * *